Patented Feb. 13, 1923.

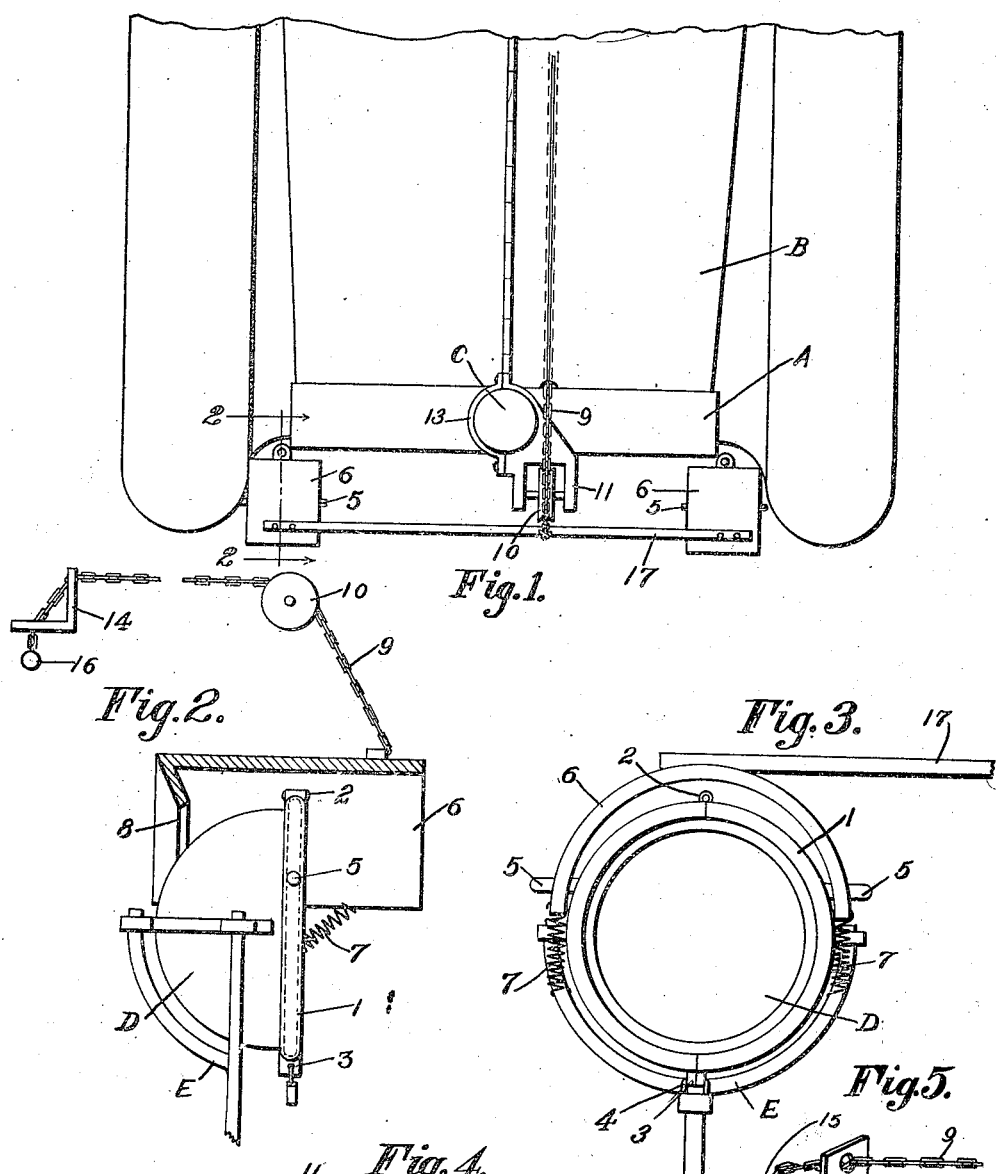

1,445,182

UNITED STATES PATENT OFFICE.

CHARLES HOWARD STAMM, OF INDIANAPOLIS, INDIANA, ASSIGNOR OF ONE-THIRD TO M. A. HOSTETLER, OF KOKOMO, INDIANA.

DIMMER FOR AUTOMOBILE HEADLIGHTS.

Application filed March 26, 1921. Serial No. 455,812.

*To all whom it may concern:*

Be it known that I, CHARLES HOWARD STAMM, a citizen of the United States, residing at Indianapolis, in the county of Marion and State of Indiana, have invented a new and useful Dimmer for Automobile Headlights, of which the following is a specification.

This invention relates to a combined shade and dimmer for automobile headlights, one of its objects being to provide a device of this character which can be applied readily to an automobile and which, when in position, can be actuated so as to deflect the light rays downwardly at any desired angle, the said structure being controllable by the driver.

Another object is to provide a device of this character which can be operated quickly and effectively and which can be quickly placed in or removed from position on a motor vehicle.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a plan view showing the device in position.

Figure 2 is a section on line 2—2, Figure 1, the lamp being shown in elevation.

Figure 3 is a front elevation of one lamp equipped with this improvement.

Figure 4 is a plan view of the sheave carrying bracket.

Figure 5 is a detail view of the chain holding bracket.

Referring to the figures by characters of reference A designates the radiator, B the hood and C the radiator cap of an automobile, the usual lamps D being mounted in front of the radiator at the sides thereof within suitable supports E, as shown.

The present improvement includes a split ring 1 made up of members hingedly connected as indicated at 2, the free ends of the ring being outturned to provide ears 3 adapted to be engaged by a bolt 4 whereby the ring can be applied to the rim of a lamp and fastened thereto securely by tightening the bolt. This ring has oppositely extending pivot lugs or projections 5 on which is pivotally mounted a transversely arched hood 6. Springs 7 are connected to the sides of the hood and to the ring and serve to pull the front portion of the hood downwardly so as to partly cover the lens of the lamp. An inwardly turned flange 8 is provided at the back of the hood and is designed to engage the top portion of the lamp, thus to limit the upward swinging of the hood.

Connected to the front portion of the hood 6 is a flexible actuating device which can be in the form of a chain 9 extending over a guide sheave 10. This guide sheave is preferably mounted within a bracket 11 having a recessed portion 12 adapted to straddle the filling neck of the radiator A below the cap C. A yoke 13 is adapted to be fastened to the bracket so as to cooperate therewith for holding the bracket to the neck of the radiator thus to maintain the sheave 10 in proper position. From this sheave the actuating device 9 can be extended back under the hood B and thence to a bracket 14 mounted on the dash-board of the vehicle, this bracket being provided with a fork 15 through which the connection 9 can extend. For the purpose of holding the connection in engagement with the fork a ball 16 or other small weight can be connected to the free end of the part 9 as shown in Figure 5. With the chain in engagement with this bracket 14 the hood 6 cannot swing downwardly. By disengaging the chain from the bracket 14, however, the springs 7 will operate to swing the hood downwardly so as to partly conceal the lens and deflect the light rays at a desired angle.

In order that the hoods mounted on the two lamps can be caused to operate in unison, said hoods are connected by a cross bar 17 to which the operating member 9 is attached as shown. Thus it is unnecessary to provide a separate member 9 for each hood as would be the case should this bar 17 not be employed.

What is claimed is:—

A device of the class described comprising a ring shaped to fit the rim of a vehicle lamp and to be detachably mounted thereon, oppositely extending pivots projecting from said ring, a transversely arched hood in advance of its pivots mounted to swing on said pivots, coiled springs connecting the front portion of the hood with said ring to pull said portion normally downward, an inturned flange at the rear end of the hood to engage the lamp and limit the upward swinging movement of the hood, and means under the control of the driver for tilting said hood against the tension of said springs.

In testimony that I claim the foregoing as my own, I have hereto affixed my signature in the presence of two witnesses.

CHARLES HOWARD STAMM.

Witnesses:
    E. B. SPRAGUE,
    ISAAC W. DOUGLASS.